(12) United States Patent
Spinelli

(10) Patent No.: US 11,261,045 B2
(45) Date of Patent: Mar. 1, 2022

(54) REWINDER WINDING METHODS AND APPARATUS

(71) Applicant: Paper Converting Machine Company, Green Bay, WI (US)

(72) Inventor: Stefano Spinelli, Green Bay, WI (US)

(73) Assignee: PAPER CONVERTING MACHINE COMPANY, Green Bay, WI (US)

( * ) Notice: Subject to any disclaimer, the term of this patent is extended or adjusted under 35 U.S.C. 154(b) by 142 days.

(21) Appl. No.: 16/804,311

(22) Filed: Feb. 28, 2020

(65) Prior Publication Data

US 2020/0277153 A1    Sep. 3, 2020

Related U.S. Application Data

(60) Provisional application No. 62/812,467, filed on Mar. 1, 2019.

(51) Int. Cl.
*B65H 19/29*    (2006.01)
*B65H 19/22*    (2006.01)

(52) U.S. Cl.
CPC ......... *B65H 19/2269* (2013.01); *B65H 19/29* (2013.01); *B65H 2301/4181* (2013.01); *B65H 2408/235* (2013.01)

(58) Field of Classification Search
CPC .... B65H 19/29; B65H 19/2269; B65H 26/00; B65H 2301/4181; B65H 2408/235
See application file for complete search history.

(56) References Cited

U.S. PATENT DOCUMENTS

| | | | |
|---|---|---|---|
| 5,820,065 A | * | 10/1998 | Altosaar ................ B65H 19/28 242/534 |
| 6,755,940 B2 | | 6/2004 | Lin et al. |
| 7,000,864 B2 | | 2/2006 | McNeil et al. |
| | | | (Continued) |

FOREIGN PATENT DOCUMENTS

| | | |
|---|---|---|
| CA | 2789723 A1 | 3/2013 |
| EP | 1513754 B1 | 3/2005 |
| | (Continued) | |

OTHER PUBLICATIONS

International Search Report and Written Opinion for PCT/US2020/020348 dated May 11, 2020.

*Primary Examiner* — Sang K Kim
(74) *Attorney, Agent, or Firm* — Thompson Coburn LLP

(57) ABSTRACT

A converting line includes a rewinding machine for winding web material into a log. For time points during a time period of the log wind cycle, predictive information representative of a log to be wound is generated and stored in a memory of a control of the rewinding machine. An image capture device is enabled to capture a plurality of images of the log being wound in the winding nest at the plurality of corresponding time points during the time period. Log image capture information is generated based upon the plurality of captured images and corresponding time points during the time period. The log image capture information is compared with the generated predictive log image information to determine a difference in log image. Revised predictive log image information is generated based at least in part upon a difference in the log image capture information relative to predictive log image information.

20 Claims, 6 Drawing Sheets

(56) References Cited

U.S. PATENT DOCUMENTS

| | | |
|---|---|---|
| 9,845,574 B2 | 12/2017 | Bomstad et al. |
| 10,227,197 B2 | 3/2019 | DeBruler et al. |
| 2017/0327337 A1 | 11/2017 | Bixler et al. |
| 2018/0008104 A1 | 1/2018 | Becker et al. |
| 2019/0048526 A1 | 2/2019 | Kettunen et al. |
| 2019/0301099 A1 | 10/2019 | Montagnani et al. |
| 2021/0269268 A1 | 9/2021 | Giurlani et al. |
| 2021/0269269 A1 | 9/2021 | Giurlani et al. |

FOREIGN PATENT DOCUMENTS

| | | |
|---|---|---|
| WO | 2009029017 A9 | 2/2010 |
| WO | 2018011033 A1 | 1/2018 |
| WO | 2018236389 A1 | 12/2018 |
| WO | 2019185348 A1 | 10/2019 |
| WO | 2019185438 A1 | 10/2019 |
| WO | 2019224182 A1 | 12/2019 |
| WO | 2019244182 A1 | 12/2019 |
| WO | 2019244183 A1 | 12/2019 |

* cited by examiner

REWINDER WINDING METHODS AND APPARATUS

RELATED APPLICATION DATA

This application claims the benefit of U.S. provisional application Ser. No. 62/812,467, filed Mar. 1, 2019, the disclosure of which is incorporated by reference herein.

BACKGROUND

Disclosed in more detail below is a method and an apparatus for assessing the formation of a log being wound on a surface, hybrid, or center winder, and other methods and apparatus for converting line controls based upon such assessments of log formation.

As will become evident from the discussion that follows, the systems and methods described herein allow converting machinery to be less complex to operate, reduce new converting line commissioning time, simplify product changeovers, maximize uptime, and reduce cost. The systems and methods described herein seek to limit the effects of variability in winding processes, thereby allowing for optimizing up-time and minimizing operator intervention while increasing processing speeds. The systems and methods disclosed herein allow for accurately determining events in the log wind cycle that are in part caused by winding speed, changing web conditions, parent roll condition, and other upstream processes.

Conventionally, these variabilities are manually handled by operators of the equipment. Oftentimes, on the fly adjustments are made as the operator observes the process, or pre-programmed adjustments are made based on assumed criteria and visual observation. For instance, excessive vibration of a log during winding is visible to the naked eye only when it has reached a relatively high level of amplitude and most likely after the log has already started to lose some of its desired properties (loss of caliper or bulk, distortion of embossed pattern) and waste is generated. The result is that the operator often takes conservative action to avoid process or quality issues, for instance, by operating the rewinder line at "safe speed" which is significantly lower (down to 30% lower) than the rated or desired speed for a specific product application with obvious consequences on machine productivity and finished log specifications (e.g., diameter, caliper, etc.). The concern may be heightened when winding low firmness logs that are especially susceptible to vibration such as bathroom tissue (BRT) or household towel (HHT). Processing speeds for such low firmness product applications is often limited to reduce the onset of unacceptable conditions in the winding log. Generally, these methods all detract from overall machine efficiency because they either require operator time and intervention, or the adjustments are based on general assumptions, which may be inapplicable for a particular condition or root cause.

Using the systems and methods described herein, data indicative of log formation, for instance, log position, log geometry, log displacement, and log vibration may be captured for enhanced converting line performance, production, and/or material utilization. The disclosure, which may be applicable to either surface, hybrid, or center winders, describes the use of high speed image capturing equipment to sense log formation vis-à-vis log position, geometry, displacement, and vibration during the wind process to provide more accurate feedback, and adaptive and predictive controls and machine learning strategies that may reduce operator intervention and other inefficiencies.

DETAILED DESCRIPTION

Figure 1:
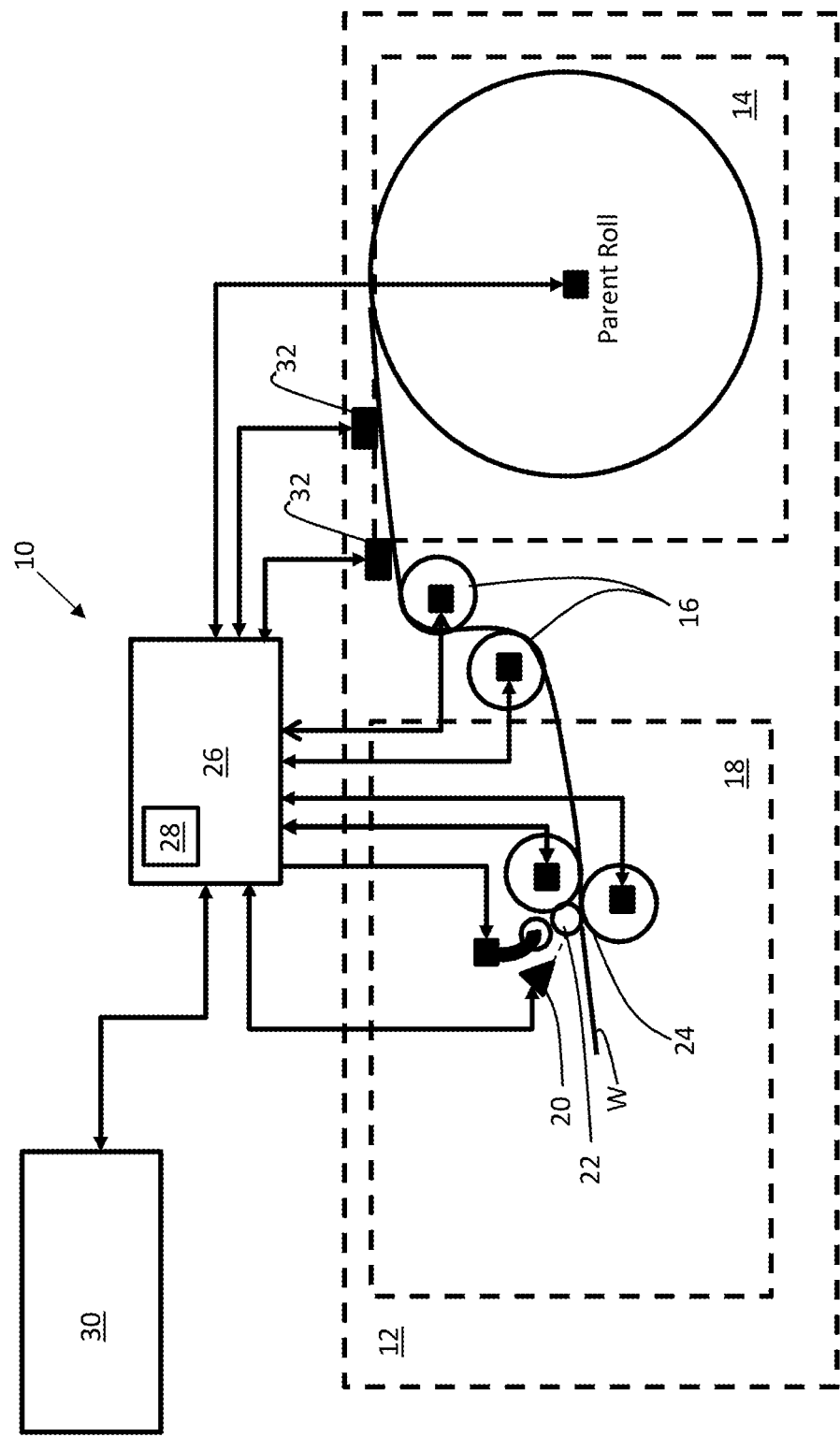
FIG. 1 is a schematic diagram of a control system for a converting line showing the various components of the converting line that may be controlled via the control system.
Figure 2:
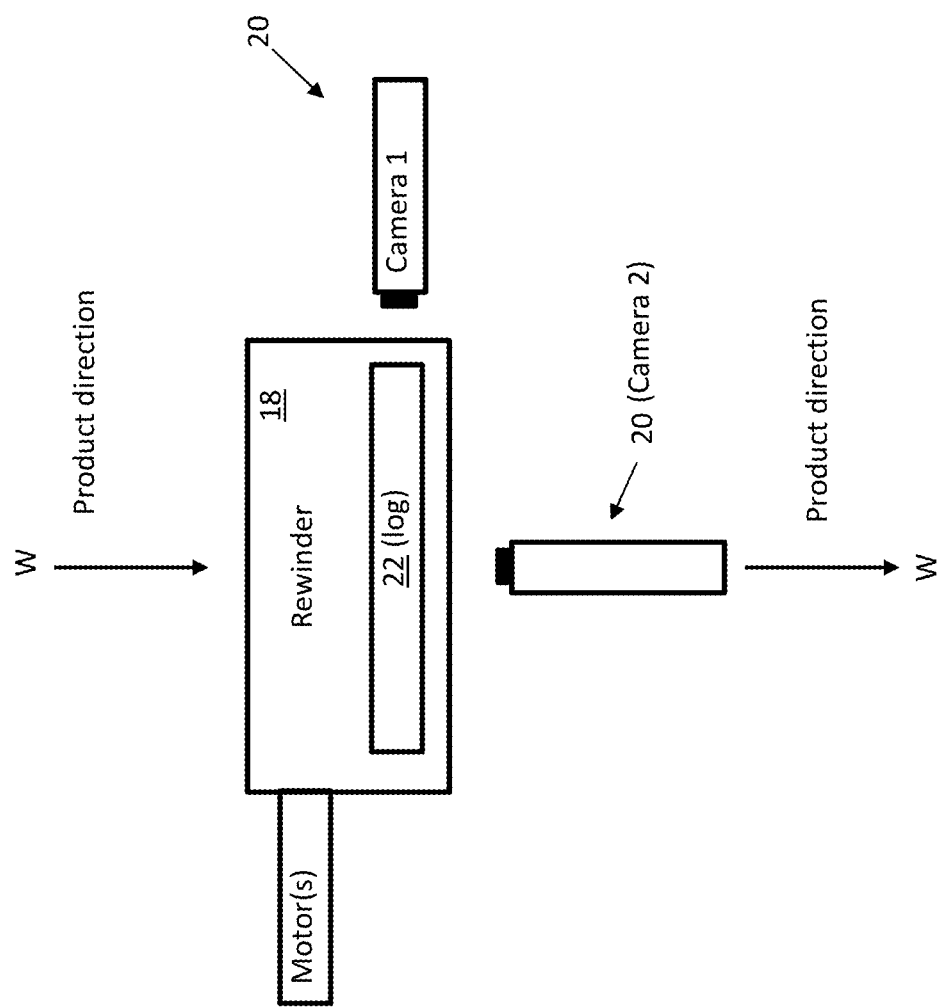
FIG. 2 is a schematic diagram illustrating a layout of a winding nest of a rewinding machine and an image capture system arranged relative to the winding nest to capture images of a log to be wound.

FIG. 1 illustrates schematically a control system 10 for a converting line 12 and the various components of the converting line that may be controlled via the control system. By way of example, the converting line 12 may include a parent roll unwind machine 14, web handling rolls 16, and a rewinding machine 18. As will be discussed in greater detail below, the control system 10 may be configured for adaptive and predictive feedback to streamline operation. One method may be through the use of an image capture device 20 associated with a log 22 being wound in the winding nest 24 of the rewinding machine 18, an example of which is shown in FIG. 2, and may include other sensors located in the converting line.

In one aspect of the disclosure, for a specific product application, the theoretical or predicted image-related characteristics of the log as it is being formed in the winding nest at any given time in the wind cycle may be calculated or generated using extrapolation methods from past experience and/or prior observations, and/or collected data, mathematical calculations, and/or simulations (including computer simulations) of the winding process. The predictive image related information may be used by the control system 10 to establish baseline information for the specific product application at any given time in the wind cycle. The predictive image related information may allow development by the control system 10 of other operating parameters including by way of example and not in any limiting sense, log position, log diameter and build, log geometry, and/or displacement of the log, core center position, for instance, position in a radial format (angle, radius) or Cartesian format (x,y), log vibration frequency and log vibration amplitude. Other theoretical or predicted information for other parameter(s) related to operation of the converting line 12 may also be calculated or generated by the control system 10, for instance, caliper of the web, the amount of web being wound around the log being processed, web speed, and log rotational speed and core rotational speed. Each parameter of the predictive information, including the predictive image related information, may be correlated to corresponding time points during time period of the wind cycle. Predictive information associated with one or more of the converting line operating parameters, including the generated predictive image related information, may be correlated by the control system 10 to the predictive information of another converting operating parameter for a corresponding time point during a time period in the wind cycle. The predictive information associated with one or more of the operating parameters of the converting line, including the predictive image formation, may be formatted into data structures with data representative of the parameter. The data structures may be stored in a memory of a database associated with a control system of the converting line or rewinding machine, depending upon the configuration of the line, or a cloud computing or other distributed computing system.

The control system 10 may include a controller 26 that may include a processor 28 and memory 30. The controller 26 may be adapted and configured to process the predictive information representative of the converting line operating parameters, including the predictive image information. The predictive information may be calculated and generated with the controller 26 and/or may be calculated and generated at another device and uploaded to the memory of the controller via a network or other data input device. For instance, the predictive information may be generated when a product manufacturing job is loaded into the control (HMI) of the converting line. Depending upon the format of the predictive information and the processor 28 associated with the controller 26, the controller may generate the predictive information from information that has already been previously stored in a database at time the predictive information is needed for use in operating the converting line. Accordingly, the steps of generating and using the predictive information may be the same, or different but nearly simultaneous.

A threshold associated with an operating parameter of the converting line may also be generated and processed by the controller 26 of the control system 10 of the converting line 12. The threshold value may also be correlated to the predictive information associated with a converting line operating parameter and may be formatted as a data structure stored in the memory of the database 30 associated with the control system 10 of the converting line. As will be described in greater detail below, the controller 26 may be configured to compare an operating parameter of the converting line with the predictive information of the parameter during the time period when winding the log and determine a difference between the operating parameter of the converting line with the predictive information of the parameter. When the difference between the operating parameter of the converting line and the predictive information of the parameter is greater than the operating parameter threshold, the controller 26 may be configured to generate and transmit signals to equipment in the converting line, including but not limited to displays of information related to the operating parameter on an human machine interface (HMI) associated with the converting line, the drives of guide rolls, the drive of an unwinder, the position drives on the wind nest rolls (for instance, to adjust nip spacing between the upper and lower winding drum, and if applicable, the position of any rider roll).

To determine image related information of the log during formation when winding the log in the winding nest of the rewinding machine of the converting line, a high speed image capturing system 20, for instance, a camera with a stroboscopic light, may be used to capture frame-like images of a log winding in the rewinding machine wind nest at any time during the wind cycle from the beginning to the end of the cycle. The image capture system 20 may be configured in the winding nest as shown in FIG. 2. By way of example and not in any limiting sense, the image capture system 20 may be one of any of the following: a Strobe-Cam™ system provided by Limess Messtechnick & Software Gmbh, a V-Shooter™ system provided by Synergys Technologies, an Iris M Series™ system provided by RDI Technologies, a LumiTrax™ system provided by Keyence. The images captured with the image capture system 20 may be used to generate additional information of the log being wound in the winding nest of the rewinding machine, for instance, as mentioned above, log position, log diameter and build, log geometry, displacement of the log, and/or core center position, for instance, position in a radial format (angle, radius) or Cartesian format (x,y), log vibration frequency and log vibration amplitude. Each parameter of the log image capture information may be correlated by the control system 10 to corresponding time points during time period of the wind cycle. The predictive image related information may be compared with the image information from the successive captured images of the log formation during the winding cycle to provide adaptive and predictive feedback to the control system as described above. The information may also be used to provide control information to a database for use in running the specific product recipe in the future, and in general, other converting line product applications and processes in the future. In one aspect, the information may be used also to gather useful insights on processing runs of the same or similar products in the future.

In another aspect, the information may be used to gather useful insights on machine operation, maintenance actions, and preventative maintenance of the rewinding machine or other components in the converting line. In particular, the controller 26 of the control system may be adapted and configured to generate predictive lifecycle information for a component of the converting line, and then generate revised predictive lifecycle information for that component based at least in part upon a difference in the log image capture information relative to predictive log image related information. For instance, the controller may initially generate data that a roll cover of an embossing roll has an expected life of 7000 runtime hours. Based on actual log vibration frequency and log vibration amplitude as captured by the image capture system 20, the controller may be enabled to generate revised predictive information for the roll cover of the embossing roller by extending the life cycle if the actual log vibration frequency and log vibration amplitude are less than the predictive log image related information or by shortening the life cycle if the actual log vibration frequency and log vibration amplitude are greater than the predictive log image related information. In a similar way, the controller 26 of the controller may be adapted and configured to generate predictive maintenance information for a component of the converting line, and generate revised predictive maintenance information for the component based at least in part upon a difference in the log image capture information relative to predictive log image related information. For instance, the controller may initially generate data that a roll cover surface of an embossing roller requires no maintenance if log vibration frequency and log vibration amplitude are at a given level. Based on actual log vibration frequency and log vibration amplitude as captured by the image capture system 20, the controller may be enabled to generate revised predictive maintenance or troubleshooting information for the roll cover of the embossing roller by extending the maintenance or trouble shooting cycle if the actual log vibration frequency and log vibration amplitude are less than the predictive log image related information or by shortening the maintenance or trouble shooting cycle (or indicating a maintenance or troubleshooting condition exists) if the actual log vibration frequency and log vibration amplitude are greater than the predictive log image related information.

As shown schematically in FIG. 1, the control system 10 may interface with other sensors 32 on the converting line including but not limited to those measuring parent roll diameter, web caliper, the amount of web being processed, web tension, web speed, and log angular or rotational velocity, and log core angular or rotational velocity. Sensors for measuring the amount of web being wound on the log during the wind cycle, caliper, parent roll diameter, web tension, web speed, log and core angular or rotational velocity are known and not discussed herein for the sake of brevity, but may include the methods as discussed in application Ser. No. 62/652,499, filed Apr. 4, 2018, the disclosure of which is incorporated by reference. The determination of parent roll diameter, web caliper, the amount of web being processed, web tension, web speed, log angular or rotational velocity, and/or core angular or rotation velocity may be via sensors that directly measure the web or rotating log, or by indirect determination using other parameters that enable calculation of parent roll diameter, caliper, the amount of web being processed, web tension, web speed, and/or log angular or rotational velocity. For instance, a diameter sensor may use laser time-of-flight technology to calculate the distance from the sensor to the surface of the log or unwinding parent roll, thereby effectively directly measuring the radius, and indirectly determining caliper by calculating the difference in radius after successive revolutions of the log or unwinding parent roll. One such sensor is a Banner LTF12UC2LDQ. Such a sensor has proven satisfactory to measure rotating parent roll radius during unwinding and provide an estimation of caliper. In another example, web tension may be determined by a load cell associated with the guide rolls 16 in the converting process.

Figure 3:
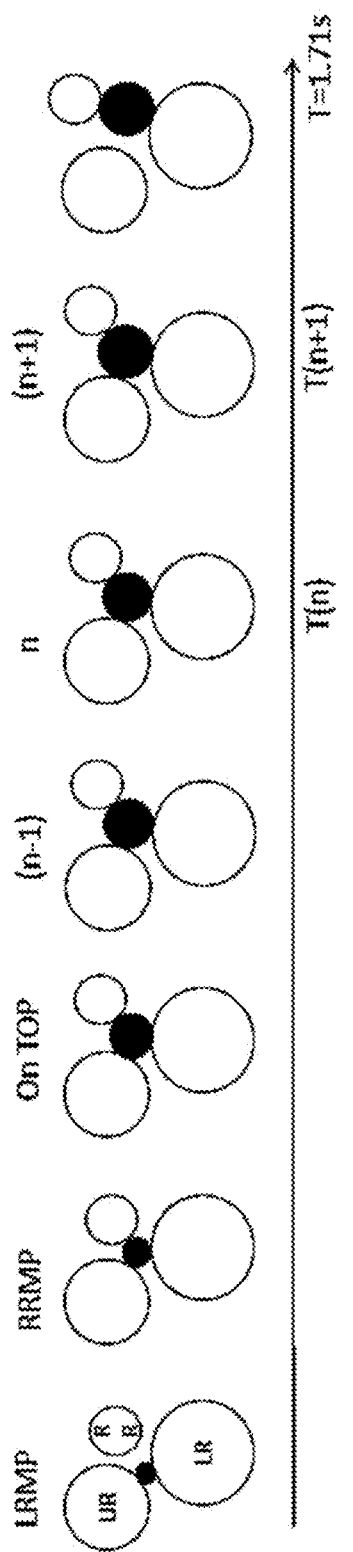
FIG. 3 illustrates a progression of images captured by the image capture system from a time when the lower roll meets the product or initial log winding (LRMP), the rider roll meets the product (RRMP), the product moves to a position generally on top of the lower roll, and the rider roll moves through successive positions as the log increases in diameter and is discharged from the winding nest.

The control system 10 and image capture system 20 may be configured to obtain a sufficient number (n) of images and captured image information to sample motion of the log during a plurality of time point in a desired time period (or entire time period) during the wind cycle. A desired interval may be set (e.g., 100 milliseconds) based on the wind cycle time, and/or at specific point of interests in winding cycle (e.g., when the rider roll meets the log, or another position of the rider roll prior to discharge of the log). FIG. 3 illustrates the progression of images that may be captured by the image capture system. The number (n) of images may be based upon web speed and log angular or rotational velocity. A set of images may then be processed with the controller of the control system to develop specific control information, such as by way of example and not in any limiting sense:

the actual position $P[x(n),y(n)]$ of the core center.
the geometry of the log
the actual diameter $D(n)$ of the log
the frequency $F(n)$ and amplitude $A(n)$ of log vibration
Measurement parameters from the other sensors 32 in the converting line 12 may be correlated to the image capture information to develop additional specific control information, such as by way of example and not in any limiting sense:

the amount of web being wound around the log
the speed of the web
the rotational velocity of the log
the rotational velocity of the core of the log The controller 26 of the control system 10 for the converting line 12, or the rewinding machine 14, depending upon the converting line configuration, may be enabled to compare the log image capture information against the predictive image related information stored in the database associated with the control system. The controller may then be enabled to use the comparison of the log image capture information to the predictive image related information to develop control signals for the controlling the rewind process. In addition, the log image capture information may be stored in the database and used to modify or update the stored predictive image related information based upon certain updated criteria for future operation of the specific product application and other converting line processes base upon behavior and/or scenario matrices described below.

In a similar fashion, the controller 26 of the control system 10 for the converting line 12, or the rewinding machine 18, depending upon the converting line configuration, may be enabled to compare other converting line parameters against the predictive information stored in the database 30 associated with the control system. The controller 26 may then be enabled to use the comparison of the other line measured or determined parameter information to the predictive information to develop control signals for the controlling the rewind process. In addition, the other line measured or determined parameter information may be stored in the database and used to modify or update the stored predictive information based upon certain updated criteria for future operation of the specific product application and other converting line processes base upon behavior and/or scenario matrices described below.

In one aspect, the controller 26 of the control system 10 may use the log image capture information from the image capture system 20 to develop estimates of vibration during sampling intervals during the rewind process. The controller may be configured to process the vibration information in several ways to enhance the converting process. By monitoring for changes in vibration as the log is wound, the upstream web handling and processing equipment may be adjusted as needed to enhance line efficiency. The tension and speed of the web may be trimmed accurately in view of a given web condition by controlling drives associated with the upstream rollers 16 and/or the parent roll unwinding machine 14.

Converting processes may also be automatically adjusted to maximize machine throughput. In the case of a new product, the controller 26 may generate a basic trial recipe of parameters in order to run at a sample speed and use artificial intelligence and machine learning algorithms such as K-NN to categorize the type of product and optimize the recipe thereby providing automatic recipe generation. The description that follows below outlines some examples:

Example 1

Through the image capture process, the control may determine that actual $D(n)$ is less than $D(n)$ of the predictive image information. This condition may indicate that the caliper is thinning and insufficient for a specific product or that the winding tension is too high. Accordingly, the control may be enabled to develop control signals to reduce web tension, for instance, lowering the web tension setting using the embedded modulated web tightness control to increase actual D(n). In addition to, or in the alternative, the control may be enabled to develop control signals to reduce speed to increase actual D(n). In addition to, or in the alternative, the control may be enabled to develop control signals to change the speed of center drives or to change the speed or position of any of the components of the rewinder wind nest. The difference in diameter may be used to update the predictive information for diameter for the subsequent processing of another log in the converting line.

Example 2

Figure 4:
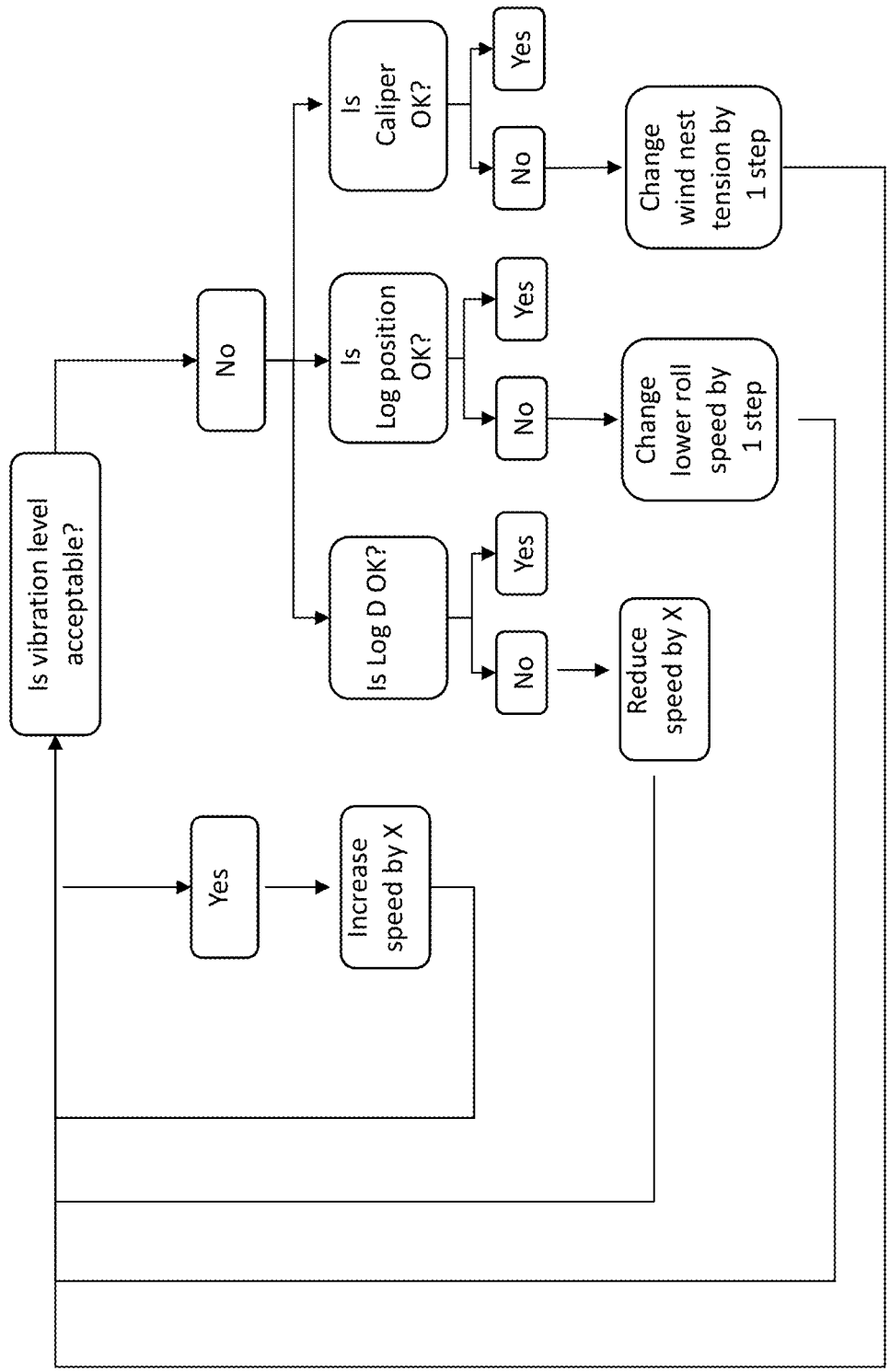
FIG. 4 is an exemplary decision tree diagram showing steps used by a controller for processing log vibration information based upon captured images and generating corresponding converting line control signals.

Through the image capture process, the control may determine that actual amplitude A(n) of vibration at a speed X m/min for a specific product is within acceptable limits when compared to $A_p(n)$ of the predictive vibration amplitude information. Accordingly, the control may be enabled to develop control signals to gradually increase winding speed in small steps (e.g., X+10 m/min) in order to improve throughput of the rewinding process while keeping the overall vibration under the desired log vibration amplitude threshold. This may prove to be especially useful as the onset of vibratory conditions often occurs at specific times in the winding cycle. Thus, the control may sense the onset of vibratory conditions, determine whether the conditions are within acceptable limits, and optimize speed for the winding cycle. FIG. 4 provides an example decision tree for processing vibration information. The difference in vibration may be used to update the predictive information for vibration frequency and/or amplitude for the subsequent processing of another log in the converting line.

Figure 5:
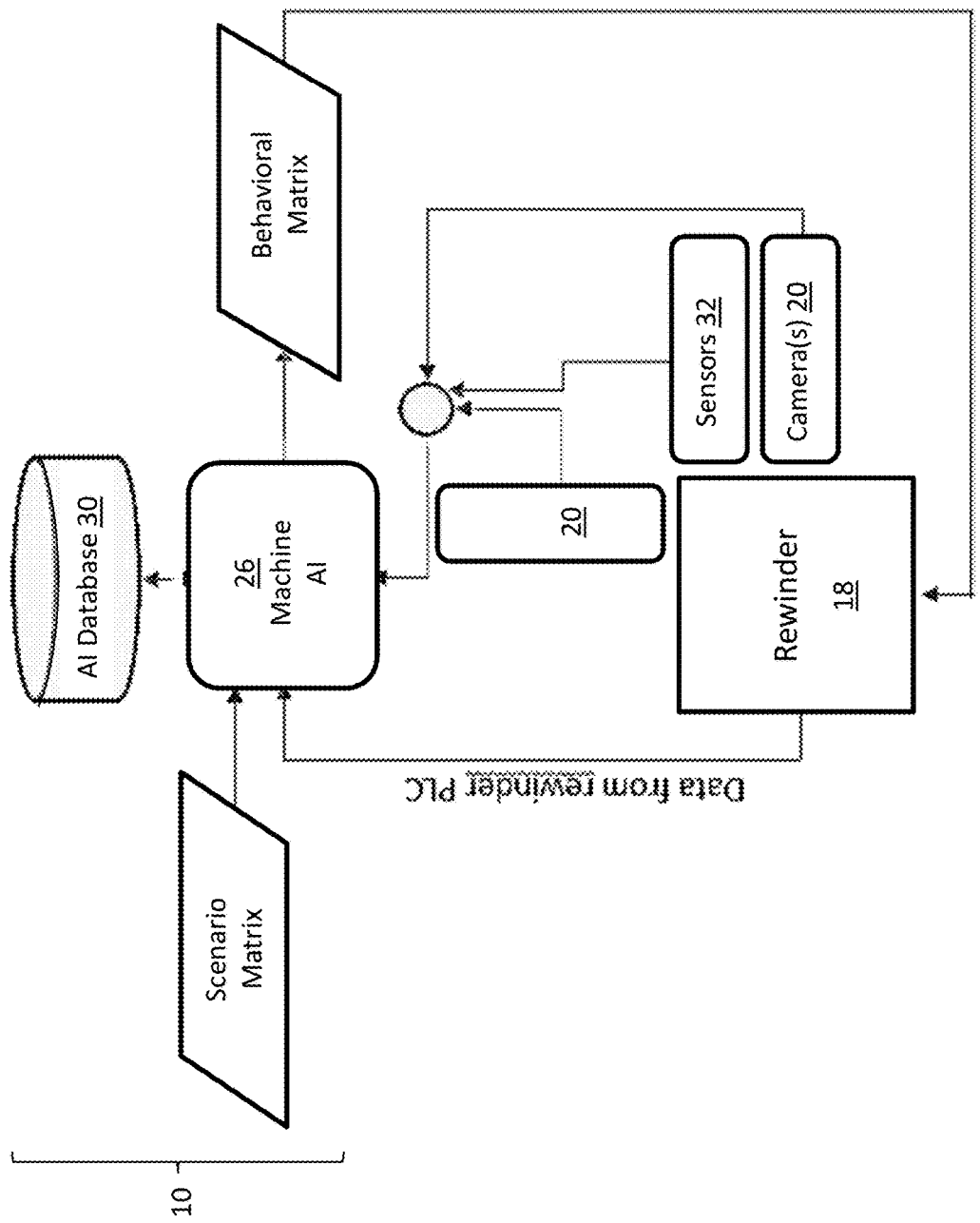
FIG. 5 is a schematic diagram illustrating a process flow for a machine learning system incorporated into the control system for the converting line.

Examples of the type described above may be developed into scenario matrices that may be stored in a database associated with the converting line control 10, for instance, as shown schematically in FIG. 5. The scenario matrices may include pre-programmed instructions with priority based upon determined conditions that the controller 26 may execute in order to pursue a desired output. The scenario matrices may be formed by sets of independent variables (labeled data or predictors) such as log diameter, log center position, web caliper, vibration amplitude or other operation parameters, which may be stored in a database 30 associated with the converting line control 10. The scenario matrices may be incorporated into existing machine process controls and/or the HMI of the machine, for instance, through a decision tree based upon operator input or upon artificial intelligence and/or machine learning algorithms. The feedback control signals developed from the execution of the scenario matrices may be analyzed to develop or prove effective strategies for addressing a specific issue on a specific product and to further refine the scenario matrices.

Figure 6:
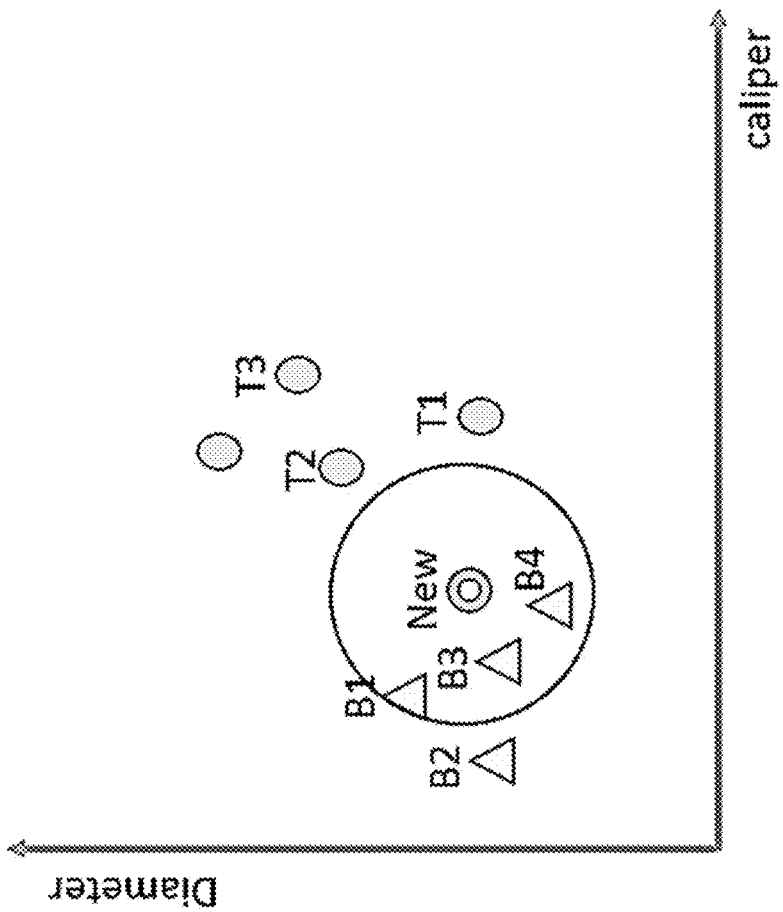
FIG. 6 is a graphic showing a method for correlating web caliper with log diameter based on a K-nearest neighbor (k-nn) machine learning algorithm.

Once the scenario matrices have been developed, artificial intelligence and/or machine learning algorithms such as linear regression methods, decision tree methods, k-nearest neighbor (K-nn) and naïve Bayes, or other equivalents may be used to develop behavioral matrices. For instance, the measurements of vibration via image capture may be sampled continuously from multiple sensors located about the log during the rewind process. The data may be collected continuously and transmitted to the processor of a controller of the converting equipment. The processor associated with the controller may be configured to perform regression analysis on the data. For instance, the processor may use a regression model that continuously updates the amplitude of vibration as a function of the amount of web material delivered to rewinder, web speed, web tension, caliper and diameter. The data to be analyzed may be stored in a first in first out (FIFO) database stack, allowing for a continuously adapting fit of the recent history of the running log. Past operations involving similar logs previously processed in the converting line may be used to update the behavioral matrices for the specific application process. The behavioral matrices for each product/substrate together with the product application parameters may be stored in a database and accessed by the controller to improve machine performance and the machine "knowledge" for a specific application process. The behavioral matrices can be updated automatically whenever the specific product application is run again, including based upon predictive information associated with logs previously processed in the converting line, and may be used to predict manufacturability and run capability of new products, including automatic generation of new product recipes. The process may be fully automated to allow for unsupervised machine learning and/or semi-supervised machine learning through minimal operator intervention. The same process may be employed to develop behavioral matrices for any other desired parameter, including those set forth above. FIG. 6 shows another example of correlating web caliper with web diameter through a K-nn machine learning algorithm. Based on the K-nn analysis, the controller is enabled to sense current operating conditions of web caliper and diameter for a new product, and compare current conditions to conditions previously stored in the database for logs previously processed in the converting line. Based on a K-nn analysis, the controller may automatically or semi-automatically generate control signals to operate the converting line accordingly for the new product.

Additionally, the behavioral matrices may be correlated to processing information associated with the winding of the parent roll to increase the effectiveness of the rewinder operation. For instance, defects detected during the process of forming the parent roll, for instance, during the winding process or during the production of the web which is wound to form the parent roll, may be tracked relative to diameter and caliper during winding of the parent roll. The data may be collected and maintained with the parent roll. The data may be representative of parent roll production parameters, such as process time, amount of web material wound, caliper, diameter, the nature of the defect, location of the defect, size of the defect (in terms of a dimension in a direction of the web movement and a dimension in a direction transverse to the web movement), and/or severity of the defect.

This roll specific data representative of the manufacturing and upstream winding of the parent roll prior to delivery to the converting line may also be uploaded into the database and correlated with the behavioral matrices and other rewinder process parameters. When the parent roll is queued for use in a converting process, the parent roll production data may be uploaded to a control system database associated with the rewinder. The specific data associated with the manufacturing and/or winding of the parent roll (prior to unwinding) may be synchronized with the diameter, caliper and vibration measurements during the rewinding process to maximize the effectiveness of the controls for the converting line. Thus, the relative condition of the web as it unwound can be used to predict log measurements and vibration during the rewind process, and appropriate proactive action can be effected through the controller to control converting equipment and the rewinder, as necessary. For instance, a certain known defect in the parent roll production occurring at a specific time, diameter, or caliper, can be tracked relative to the rewind process so that the converting line equipment and the rewinder may be operated in a manner to minimize the effects of the defect. In another example, as the bulk or modulus of the wound log changes, the controls of the converting line may be configured to change converting line handling processes to maintain a more stable operation.

Further embodiments can be envisioned by one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, various modifications and changes may be made thereunto without departing from the broader spirit and scope of the invention as set forth in the claims and that the invention is intended to cover all modifications and equivalents within the scope of the following claims.

What is claimed is:

1. A method of controlling a converting line, wherein the converting line includes a rewinding machine configured to wind a log of convolutely wound web material in a winding nest of the rewinding machine, the method comprising:
    for a time period during a wind cycle, generating predictive information representative of and related to an image of a log to be wound in the winding nest, wherein the predictive log image related information comprises information corresponding to at least one of: (a) a plurality of positions of the log to be wound in the winding nest at a plurality of corresponding time points during the time period, (b) a plurality of geometries of the log to be wound in the winding nest at a plurality of corresponding time points during the time period, (c) a plurality of diameters of a log to be wound in the winding nest at a plurality of corresponding time points during the time period, (d) a plurality of vibration frequencies of the log to be wound in the winding nest at a plurality of corresponding time points during the time period, and (e) a plurality of vibration amplitudes of the log to be wound in the winding nest at a plurality of corresponding time points during the time period;
    storing a plurality of data structures in a memory of a controller of a control system associated with the rewinding machine, wherein the data structures comprise a plurality of data items associated together that are representative of the generated predictive log image related information;
    enabling an image capture device to capture a plurality of images of a log being wound in the winding nest at the plurality of corresponding time points during the time period;
    generating log image capture information based upon the plurality of captured images and corresponding time points during the time period, wherein the log image capture information includes at least one of captured log position information, captured log geometry information, captured log diameter information, captured log vibration frequency information, and captured log vibration amplitude information;
    comparing the log image capture information with the generated predictive log image related information to determine a difference in log image;
    generating revised predictive log image related information based at least in part upon a difference in the log image capture information relative to predictive log image related information; and
    enabling the controller to generate signals for controlling the converting line based at least in part upon the revised predictive log image related information for subsequent winding of another log to be processed in the converting line.

2. The method of claim 1 further comprising:
    generating predictive information representative of a caliper of the web material of the log to be wound in the winding nest, wherein the predictive web caliper information comprises a plurality of measurements of web caliper of the log to be wound in the winding nest at the plurality of corresponding time points during the time period;
    structuring the plurality of data structures stored in the memory of the controller of the control system for the converting line with data representative of the generated predictive web caliper information;
    measuring web caliper to generate measured web caliper information at the corresponding plurality of time points during the time period;
    comparing the measured web caliper information with the generated predictive web caliper information to determine a difference in web caliper;
    generating revised predictive log web caliper information based at least in part upon a difference in the measured web caliper information relative to predictive web caliper information; and
    enabling the controller to generate signals for controlling the converting line based at least in part upon the revised predictive web caliper information for subsequent winding of another log to be processed in the converting line.

3. The method of claim 1 further comprising:
    generating predictive information representative of an amount of the web material to be wound around the log to be wound in the winding nest, wherein the predictive wound web amount information comprises a plurality of measurements of amounts of the web to be wound around the log to be wound in the winding nest at the plurality of corresponding time points during the time period;
    structuring the plurality of data structures stored in the memory of the controller of the control system for the converting line with data representative of the generated predictive wound web amount information;
    measuring amounts of web wound around the log to generate measured wound web amount information at the corresponding plurality of time points during the time period;
    comparing the measured wound web amount information with the generated predictive wound web amount information to determine a difference in wound web amount;
    generating revised predictive wound web amount information based at least in part upon a difference in the measured wound web amount information relative to predictive wound web amount information; and
    enabling the controller to generate signals for controlling the converting line based at least in part upon the revised predictive wound web amount information for subsequent winding of another log to be processed in the converting line.

4. The method of claim 1 further comprising:
    generating predictive information representative of a speed of the web material of the log to be wound in the winding nest, wherein the predictive web speed information comprises a plurality of measurements of web speed for the log to be wound in the winding nest at the plurality of corresponding time points during the time period;

structuring the plurality of data structures stored in the memory of the controller of the control system for the converting line with data representative of the generated predictive web speed information;

measuring web speed to generate measured web speed information at the corresponding plurality of time points during the time period;

comparing the measured web speed information with the generated predictive web speed information to determine a difference in web speed;

generating revised predictive web speed information based at least in part upon a difference in the measured web speed information relative to predictive web speed information; and enabling the controller to generate signals for controlling the converting line based at least in part upon the revised predictive web speed information for subsequent winding of another log to be processed in the converting line.

5. The method of claim 1 further comprising:

generating predictive information representative of a rotational speed of a log to be wound in the winding nest, wherein the predictive log rotational speed information comprises a plurality of measurements of rotational speed of the log to be wound in the winding nest at the plurality of corresponding time points during the time period;

structuring the plurality of data structures stored in the memory of the controller of the control system for the converting line with data representative of the generated predictive log rotational speed information;

measuring log rotational speed to generate measured log rotational speed information at the corresponding plurality of time points during the time period;

comparing the measured log rotational speed with the generated predictive log rotational speed information to determine a difference in log rotational speed;

generating revised predictive log rotational speed information based at least in part upon a difference in the measured log rotational speed information relative to predictive log rotational speed information; and enabling the controller to generate signals for controlling the converting line based at least in part upon the revised predictive log rotational speed information for subsequent winding of another log to be processed in the converting line.

6. The method of claim 1 further comprising:

generating predictive information representative of a rotational speed of a core of a log to be wound in the winding nest, wherein the predictive log core rotational speed information comprises a plurality of measurements of rotational speed of the core of the log to be wound in the winding nest at the plurality of corresponding time points during the time period;

structuring the plurality of data structures stored in the memory of the controller of the control system for the converting line with data representative of the generated predictive log core rotational speed information;

measuring log core rotational speed to generate measured log core rotational speed information at the corresponding plurality of time points during the time period;

comparing the measured log core rotational speed with the generated predictive log core rotational speed information to determine a difference in log core rotational speed;

generating revised predictive log core rotational speed information based at least in part upon a difference in the measured log core rotational speed information relative to predictive log core rotational speed information; and enabling the controller to generate signals for controlling the converting line based at least in part upon the revised predictive log core rotational speed information for subsequent winding of another log to be processed in the converting line.

7. The method of claim 1 wherein:

the step of storing the plurality of data structures in the memory of the controller of the control system for the converting line includes data structures associated with manufacturing of the web material to be wound around the log; and the step of enabling the control includes enabling the control to send signals to equipment in the converting line to make adjustments to operation of the converting line equipment based at least in part upon the data structures associated with the manufacturing of the web material.

8. The method of claim 1 wherein:

the step of storing the plurality of data structures in the memory of the controller of the control system includes data structures representative of log image capture information during the time period from other logs previously processed in the converting line; and the step of enabling the control includes enabling the control to send signals to equipment in the converting line to make adjustments to operation of the converting line equipment based at least in part upon the data structures representative of the log image capture information during the time period from other logs previously processed in the converting line.

9. The method of claim 1 further comprising:

generating predictive lifecycle information for at least one component of the converting line; and generating revised predictive lifecycle information for at least one component of the converting line based at least in part upon the difference in the log image capture information relative to predictive log image related information.

10. The method of claim 1 further comprising:

generating predictive maintenance information for at least one component of the converting line; and generating revised predictive maintenance information for at least one component of the converting line based at least in part upon the difference in the log image capture information relative to predictive log image related information.

11. A control system for a converting line, the control system comprising:

at least one image capture device adapted and configured to capture images of a log being convolutely wound with web material in a winding nest of a rewinding machine at a plurality of time points during a time period;

a controller including a processor and memory, the controller being adapted and configured to:

(i) process predictive information representative of and related to an image of a log to be wound in the winding nest at the plurality of time points during the time period wherein the predictive information comprises information corresponding to at least one of:
  (a) a plurality of positions of the log to be wound in the winding nest at a plurality of corresponding time points during the time period,
  (b) a plurality of geometries of the log to be wound in the winding nest at a plurality of corresponding time points during the time period,
  (c) a plurality of diameters of a log to be wound in the winding nest at a plurality of corresponding time points during the time period,
  (d) a plurality of vibration frequencies of the log to be wound in the winding nest at a plurality of corresponding time points during the time period, and
  (e) a plurality of vibration amplitudes of the log to be wound in the winding nest at a plurality of corresponding time points during the time period;
(ii) store a plurality of data structures in a memory of a controller of a control system associated with the rewinding machine, wherein the data structures comprise a plurality of data items associated together that are representative of the generated predictive image related information;
(iii) receive from the image capture device information representative of the log being wound in the winding nest at the plurality of corresponding time points during the time period;
(iv) generate log image capture information from the information received from the image capture device based upon the captured images and the plurality of time points during the time period, wherein the log image capture information includes at least one of captured log position information, captured log geometry information, captured log diameter information, captured log vibration frequency information, and captured log vibration amplitude information;
(v) compare the log image capture information with the generated predictive log image related information to determine a difference in log image;
(vi) generate revised predictive log image related information based at least in part upon a difference in the log capture image information relative to predictive log image related information; and
(vii) enable the controller to generate signals for controlling the converting line based at least in part upon the revised predictive log image related information for subsequent winding of another log to be processed in the converting line.

12. The control system of claim 11 wherein the controller is adapted and configured to: (viii) process predictive information related to a caliper of the web to be wound around the log, wherein the predictive web caliper information comprises a plurality of measurements of web caliper of the log to be wound in the winding nest at the plurality of corresponding time points during the time period; (ix) store a plurality of data structures in the memory of the controller that include the predictive caliper information; (x) determine a caliper of the web being wound around the log at the corresponding plurality of time points during the time period; (xi) compare the caliper determination to the predictive caliper information to determine a difference in caliper; and (xii) generate revised predictive web caliper information based at least in part upon a difference in the measured web caliper information relative to predictive web caliper information; and (xiii) generate signals for controlling the converting line based at least in part upon the revised predictive web caliper information for subsequent winding of another log to be processed in the converting line.

13. The control system of claim 11 wherein the controller is adapted and configured to: (viii) process predictive information related to an amount of the web material to be wound around the log to be wound wherein the predictive wound web amount comprises a plurality of measurements of amounts of the web to be wound around the log to be wound in the winding nest at the plurality of corresponding time points during the time period; (ix) store a plurality of data structures in the memory of the controller that include data representative of the predictive wound web amount information; (x) determine an amount of the web material being wound around the log at the corresponding plurality of time points during the time period; (xi) compare the determined wound web amount to the predictive wound web amount information to determine a difference in wound web amount; (xii) generate revised predictive wound web amount information based at least in part upon a difference in the measured wound web amount information relative to predictive wound web amount information; and (xiii) generate signals for controlling the converting line based at least in part upon the revised predictive wound web information for subsequent winding of another log to be processed in the converting line.

14. The control system of claim 11 wherein the controller is adapted and configured to: (viii) process predictive information related to a speed of the web material to be wound around the log to be wound wherein the predictive web speed information comprises a plurality of measurements of speed of the web to be wound around the log to be wound in the winding nest at the plurality of corresponding time points during the time period; (ix) store a plurality of data structures in the memory of the controller that include data representative of the predictive web speed information; (x) determine a web speed at the corresponding plurality of time points during the time period; (xi) compare the determined web speed to the predictive web speed information to determine a difference in web speed; (xii) generate revised predictive web speed information based at least in part upon a difference in the measured web speed information relative to predictive web speed information; and (xiii) generate signals for controlling the converting line based at least in part upon the revised predictive web speed information for subsequent winding of another log to be processed in the converting line.

15. The control system of claim 11 wherein the controller is adapted and configured to: (viii) process predictive information related to a rotational speed of the log to be wound wherein the predictive log rotational speed information comprises a plurality of measurements of rotational speed of the log to be wound in the winding nest at the plurality of corresponding time points during the time period; (ix) store a plurality of data structures in the memory of the controller that include data representative of the predictive log rotational speed information; (x) determine a log rotational speed at the corresponding plurality of time points during the time period; (xi) compare the determined log rotational speed to the predictive log rotational speed information to determine a difference in log rotational speed; (xii) generate revised predictive log rotational speed information based at least in part upon a difference in the measured log rotational speed information relative to predictive log rotational speed information; and (xiii) generate signals for controlling the converting line based at least in part upon the revised predictive log rotational speed information for subsequent winding of another log to be processed in the converting line.

16. The control system of claim 11 wherein the controller is adapted and configured to: (viii) process predictive information related to a rotational speed of a core of the log to be wound wherein the predictive log core rotational speed information comprises a plurality of measurements of rotational speed of the core of the log to be wound in the winding nest at the plurality of corresponding time points during the time period; (ix) store a plurality of data structures in the memory of the controller that include data representative of the predictive log core rotational speed information; (x) determine a log core rotational speed at the corresponding plurality of time points during the time period; (xi) compare the determined log core rotational speed to the predictive log core rotational speed information to determine a difference in log core rotational speed; (xii) generate revised predictive log core rotational speed information based at least in part upon a difference in the measured log core rotational speed information relative to predictive log core rotational speed information; and (xiii) generate signals for controlling the converting line based at least in part upon the revised predictive log core rotational speed information for subsequent winding of another log to be processed in the converting line.

17. The control system of claim 11 wherein the controller is adapted and configured abled to: (viii) store a plurality of data structures in the memory of the controller that include data representative of manufacturing of the web material; and (ix) generate signals for controlling the converting line based at least in part upon the data structures associated with the manufacturing of the web material.

18. The control system of claim 11 wherein the controller is adapted and configured to: (viii) store a plurality of data structures in the memory of the controller that include data representative of log image capture information during the time period of other logs previously processed in the converting line; and (ix) generate signals for controlling the converting line based at least in part upon the data structures associated with the log image capture information from other logs previously processed in the converting line.

19. The control system of claim 11 wherein the controller is adapted and configured to: (viii) generate predictive lifecycle information for at least one component of the converting line; and (ix) generate revised predictive lifecycle information for at least one component of the converting line based at least in part upon the difference in the log image capture information relative to predictive log image related information.

20. The control system of claim 11 wherein the controller is adapted and configured to: (viii) generate predictive maintenance information for at least one component of the converting line; and (ix) generate revised predictive maintenance information for at least one component of the converting line based at least in part upon the difference in the log image capture information relative to predictive log image related information.

* * * * *